United States Patent
Wong et al.

(10) Patent No.: US 10,399,224 B2
(45) Date of Patent: Sep. 3, 2019

(54) GRIPPING SYSTEM WHICH IS MONITORED BASED ON COUNTER ELECTROMOTIVE FORCE AND A METHOD FOR CONTROLLING THE GRIPPING SYSTEM

(71) Applicant: HIWIN TECHNOLOGIES CORP., Taichung (TW)

(72) Inventors: Chen-Ming Wong, Taichung (TW); Wei-Shao Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 16/244,901

(22) Filed: Jan. 10, 2019

(65) Prior Publication Data

US 2019/0143516 A1    May 16, 2019

Related U.S. Application Data

(63) Continuation-in-part of application No. 15/789,256, filed on Oct. 20, 2017, now abandoned, which is a continuation-in-part of application No. 15/046,169, filed on Feb. 17, 2016, now abandoned.

(51) Int. Cl.
*B25J 9/16*    (2006.01)
*B25J 9/00*    (2006.01)
*B25J 15/02*   (2006.01)

(52) U.S. Cl.
CPC ........... *B25J 9/1664* (2013.01); *B25J 9/0009* (2013.01); *B25J 9/1612* (2013.01); *B25J 15/0253* (2013.01)

(58) Field of Classification Search
CPC ..... B25J 9/1664; B25J 15/0253; B25J 9/0009
See application file for complete search history.

(56) References Cited

U.S. PATENT DOCUMENTS

| | | | | |
|---|---|---|---|---|
| 6,463,835 | B1* | 10/2002 | Segawa | B23B 31/16025 279/4.02 |
| 2009/0243526 | A1* | 10/2009 | Ito | H02P 6/182 318/400.34 |
| 2012/0239197 | A1* | 9/2012 | Ganz | B25J 15/026 700/260 |

FOREIGN PATENT DOCUMENTS

| JP | 62-144185 A | 9/1987 |
|---|---|---|
| JP | 5-318372 A | 12/1993 |
| JP | 2001-327192 A | 11/2001 |

(Continued)

*Primary Examiner* — Kawing Chan
*Assistant Examiner* — Bradley R Brown
(74) *Attorney, Agent, or Firm* — Wang Law Firm, Inc.

(57) ABSTRACT

A gripping system which is monitored based on CEMF and a method for controlling the same includes: using a controller to instruct a drive unit to rotate a stepper motor; using the controller to compare the control instruction with a control parameter matrix stored in an access unit; obtaining a CEMF threshold by checking the position of the actual CEMF in the control parameter matrix; using the controller to continuously monitor the actual CEMF; and using the controller to compare the actual counter electromotive force with the obtained corresponding counter electromotive force threshold, stopping the stepper motor and letting the gripper maintain the gripping status when the actual counter electromotive force is smaller than or equal to the counter electromotive force threshold, and maintaining driving of the stepper motor when the actual counter electromotive force is larger than the counter electromotive force threshold.

2 Claims, 9 Drawing Sheets

(56) References Cited

FOREIGN PATENT DOCUMENTS

| | | |
|---|---|---|
| JP | 2009-45687 A | 3/2009 |
| JP | 2014-46449 A | 3/2014 |
| JP | 2014-168326 A | 9/2014 |
| WO | 2015/048156 A | 4/2015 |

\* cited by examiner

| gripping inward | | | | | | | | | | |
|---|---|---|---|---|---|---|---|---|---|---|
| | gripping speed(mm/s) | | | | | | | | | |
| gripping force(N) | 5 | 10 | 15 | 20 | 25 | 30 | 35 | 40 | 45 | 50 |
| 50 | threshold value1-1-1 | threshold value1-2-1 | threshold value1-3-1 | threshold value1-4-1 | threshold value1-5-1 | threshold value1-6-1 | threshold value1-7-1 | threshold value1-8-1 | threshold value1-9-1 | threshold value1-10-1 |
| 100 | threshold value1-1-2 | threshold value1-2-2 | threshold value1-3-2 | threshold value1-4-2 | threshold value1-5-2 | threshold value1-6-2 | threshold value1-7-2 | threshold value1-8-2 | threshold value1-9-2 | threshold value1-10-2 |
| 150 | threshold value1-1-3 | threshold value1-2-3 | threshold value1-3-3 | threshold value1-4-3 | threshold value1-5-3 | threshold value1-6-3 | threshold value1-7-3 | threshold value1-8-3 | threshold value1-9-3 | threshold value1-10-3 |
| 200 | threshold value1-1-4 | threshold value1-2-4 | threshold value1-3-4 | threshold value1-4-4 | threshold value1-5-4 | threshold value1-6-4 | threshold value1-7-4 | threshold value1-8-4 | threshold value1-9-4 | threshold value1-10-4 |
| 250 | threshold value1-1-5 | threshold value1-2-5 | threshold value1-3-5 | threshold value1-4-5 | threshold value1-5-5 | threshold value1-6-5 | threshold value1-7-5 | threshold value1-8-5 | threshold value1-9-5 | threshold value1-10-5 |
| 300 | threshold value1-1-6 | threshold value1-2-6 | threshold value1-3-6 | threshold value1-4-6 | threshold value1-5-6 | threshold value1-6-6 | threshold value1-7-6 | threshold value1-8-6 | threshold value1-9-6 | threshold value1-10-6 |
| 350 | threshold value1-1-7 | threshold value1-2-7 | threshold value1-3-7 | threshold value1-4-7 | threshold value1-5-7 | threshold value1-6-7 | threshold value1-7-7 | threshold value1-8-7 | threshold value1-9-7 | threshold value1-10-7 |
| 400 | threshold value1-1-8 | threshold value1-2-8 | threshold value1-3-8 | threshold value1-4-8 | threshold value1-5-8 | threshold value1-6-8 | threshold value1-7-8 | threshold value1-8-8 | threshold value1-9-8 | threshold value1-10-8 |
| 450 | threshold value1-1-9 | threshold value1-2-9 | threshold value1-3-9 | threshold value1-4-9 | threshold value1-5-9 | threshold value1-6-9 | threshold value1-7-9 | threshold value1-8-9 | threshold value1-9-9 | threshold value1-10-9 |
| 500 | threshold value1-1-10 | threshold value1-2-10 | threshold value1-3-10 | threshold value1-4-10 | threshold value1-5-10 | threshold value1-6-10 | threshold value1-7-10 | threshold value1-8-10 | threshold value1-9-10 | threshold value1-10-10 |
| 550 | threshold value1-1-11 | threshold value1-2-11 | threshold value1-3-11 | threshold value1-4-11 | threshold value1-5-11 | threshold value1-6-11 | threshold value1-7-11 | threshold value1-8-11 | threshold value1-9-11 | threshold value1-10-11 |
| 600 | threshold value1-1-12 | threshold value1-2-12 | threshold value1-3-12 | threshold value1-4-12 | threshold value1-5-12 | threshold value1-6-12 | threshold value1-7-12 | threshold value1-8-12 | threshold value1-9-12 | threshold value1-10-12 |
| 650 | threshold value1-1-13 | threshold value1-2-13 | threshold value1-3-13 | threshold value1-4-13 | threshold value1-5-13 | threshold value1-6-13 | threshold value1-7-13 | threshold value1-8-13 | threshold value1-9-13 | threshold value1-10-13 |
| 700 | threshold value1-1-14 | threshold value1-2-14 | threshold value1-3-14 | threshold value1-4-14 | threshold value1-5-14 | threshold value1-6-14 | threshold value1-7-14 | threshold value1-8-14 | threshold value1-9-14 | threshold value1-10-14 |

| gripping force(N) | gripping speed(mm/s) | | | | | | | | | |
|---|---|---|---|---|---|---|---|---|---|---|
| | 55 | 60 | 65 | 70 | 75 | 80 | 85 | 90 | 95 | 100 |
| 50 | threshold value1-11-1 | threshold value1-12-1 | threshold value1-13-1 | threshold value1-14-1 | threshold value1-15-1 | threshold value1-16-1 | threshold value1-17-1 | threshold value1-18-1 | threshold value1-19-1 | threshold value1-20-1 |
| 100 | threshold value1-11-2 | threshold value1-12-2 | threshold value1-13-2 | threshold value1-14-2 | threshold value1-15-2 | threshold value1-16-2 | threshold value1-17-2 | threshold value1-18-2 | threshold value1-19-2 | threshold value1-20-2 |
| 150 | threshold value1-11-3 | threshold value1-12-3 | threshold value1-13-3 | threshold value1-14-3 | threshold value1-15-3 | threshold value1-16-3 | threshold value1-17-3 | threshold value1-18-3 | threshold value1-19-3 | threshold value1-20-3 |
| 200 | threshold value1-11-4 | threshold value1-12-4 | threshold value1-13-4 | threshold value1-14-4 | threshold value1-15-4 | threshold value1-16-4 | threshold value1-17-4 | threshold value1-18-4 | threshold value1-19-4 | threshold value1-20-4 |
| 250 | threshold value1-11-5 | threshold value1-12-5 | threshold value1-13-5 | threshold value1-14-5 | threshold value1-15-5 | threshold value1-16-5 | threshold value1-17-5 | threshold value1-18-5 | threshold value1-19-5 | threshold value1-20-5 |
| 300 | threshold value1-11-6 | threshold value1-12-6 | threshold value1-13-6 | threshold value1-14-6 | threshold value1-15-6 | threshold value1-16-6 | threshold value1-17-6 | threshold value1-18-6 | threshold value1-19-6 | threshold value1-20-6 |
| 350 | threshold value1-11-7 | threshold value1-12-7 | threshold value1-13-7 | threshold value1-14-7 | threshold value1-15-7 | threshold value1-16-7 | threshold value1-17-7 | threshold value1-18-7 | threshold value1-19-7 | threshold value1-20-7 |
| 400 | threshold value1-11-8 | threshold value1-12-8 | threshold value1-13-8 | threshold value1-14-8 | threshold value1-15-8 | threshold value1-16-8 | threshold value1-17-8 | threshold value1-18-8 | threshold value1-19-8 | threshold value1-20-8 |
| 450 | threshold value1-11-9 | threshold value1-12-9 | threshold value1-13-9 | threshold value1-14-9 | threshold value1-15-9 | threshold value1-16-9 | threshold value1-17-9 | threshold value1-18-9 | threshold value1-19-9 | threshold value1-20-9 |
| 500 | threshold value1-11-10 | threshold value1-12-10 | threshold value1-13-10 | threshold value1-14-10 | threshold value1-15-10 | threshold value1-16-10 | threshold value1-17-10 | threshold value1-18-10 | threshold value1-19-10 | threshold value1-20-10 |
| 550 | threshold value1-11-11 | threshold value1-12-11 | threshold value1-13-11 | threshold value1-14-11 | threshold value1-15-11 | threshold value1-16-11 | threshold value1-17-11 | threshold value1-18-11 | threshold value1-19-11 | threshold value1-20-11 |
| 600 | threshold value1-11-12 | threshold value1-12-12 | threshold value1-13-12 | threshold value1-14-12 | threshold value1-15-12 | threshold value1-16-12 | threshold value1-17-12 | threshold value1-18-12 | threshold value1-19-12 | threshold value1-20-12 |
| 650 | threshold value1-11-13 | threshold value1-12-13 | threshold value1-13-13 | threshold value1-14-13 | threshold value1-15-13 | threshold value1-16-13 | threshold value1-17-13 | threshold value1-18-13 | threshold value1-19-13 | threshold value1-20-13 |
| 700 | threshold value1-11-14 | threshold value1-12-14 | threshold value1-13-14 | threshold value1-14-14 | threshold value1-15-14 | threshold value1-16-14 | threshold value1-17-14 | threshold value1-18-14 | threshold value1-19-14 | threshold value1-20-14 |

FIG.4-1

| gripping outward | | | | | | | | | | | | | | |
|---|---|---|---|---|---|---|---|---|---|---|---|---|---|---|
| | gripping speed(mm/s) | | | | | | | | | | | | | |
| gripping force(N) | 5 | 10 | 15 | 20 | 25 | 30 | 35 | 40 | 45 | 50 | | | | |
| 50 | threshold value2-1-1 | threshold value2-2-1 | threshold value2-3-1 | threshold value2-4-1 | threshold value2-5-1 | threshold value2-6-1 | threshold value2-7-1 | threshold value2-8-1 | threshold value2-9-1 | threshold value2-10-1 | | | | |
| 100 | threshold value2-1-2 | threshold value2-2-2 | threshold value2-3-2 | threshold value2-4-2 | threshold value2-5-2 | threshold value2-6-2 | threshold value2-7-2 | threshold value2-8-2 | threshold value2-9-2 | threshold value2-10-2 | | | | |
| 150 | threshold value2-1-3 | threshold value2-2-3 | threshold value2-3-3 | threshold value2-4-3 | threshold value2-5-3 | threshold value2-6-3 | threshold value2-7-3 | threshold value2-8-3 | threshold value2-9-3 | threshold value2-10-3 | | | | |
| 200 | threshold value2-1-4 | threshold value2-2-4 | threshold value2-3-4 | threshold value2-4-4 | threshold value2-5-4 | threshold value2-6-4 | threshold value2-7-4 | threshold value2-8-4 | threshold value2-9-4 | threshold value2-10-4 | | | | |
| 250 | threshold value2-1-5 | threshold value2-2-5 | threshold value2-3-5 | threshold value2-4-5 | threshold value2-5-5 | threshold value2-6-5 | threshold value2-7-5 | threshold value2-8-5 | threshold value2-9-5 | threshold value2-10-5 | | | | |
| 300 | threshold value2-1-6 | threshold value2-2-6 | threshold value2-3-6 | threshold value2-4-6 | threshold value2-5-6 | threshold value2-6-6 | threshold value2-7-6 | threshold value2-8-6 | threshold value2-9-6 | threshold value2-10-6 | | | | |
| 350 | threshold value2-1-7 | threshold value2-2-7 | threshold value2-3-7 | threshold value2-4-7 | threshold value2-5-7 | threshold value2-6-7 | threshold value2-7-7 | threshold value2-8-7 | threshold value2-9-7 | threshold value2-10-7 | | | | |
| 400 | threshold value2-1-8 | threshold value2-2-8 | threshold value2-3-8 | threshold value2-4-8 | threshold value2-5-8 | threshold value2-6-8 | threshold value2-7-8 | threshold value2-8-8 | threshold value2-9-8 | threshold value2-10-8 | | | | |
| 450 | threshold value2-1-9 | threshold value2-2-9 | threshold value2-3-9 | threshold value2-4-9 | threshold value2-5-9 | threshold value2-6-9 | threshold value2-7-9 | threshold value2-8-9 | threshold value2-9-9 | threshold value2-10-9 | | | | |
| 500 | threshold value2-1-10 | threshold value2-2-10 | threshold value2-3-10 | threshold value2-4-10 | threshold value2-5-10 | threshold value2-6-10 | threshold value2-7-10 | threshold value2-8-10 | threshold value2-9-10 | threshold value2-10-10 | | | | |
| 550 | threshold value2-1-11 | threshold value2-2-11 | threshold value2-3-11 | threshold value2-4-11 | threshold value2-5-11 | threshold value2-6-11 | threshold value2-7-11 | threshold value2-8-11 | threshold value2-9-11 | threshold value2-10-11 | | | | |
| 600 | threshold value2-1-12 | threshold value2-2-12 | threshold value2-3-12 | threshold value2-4-12 | threshold value2-5-12 | threshold value2-6-12 | threshold value2-7-12 | threshold value2-8-12 | threshold value2-9-12 | threshold value2-10-12 | | | | |
| 650 | threshold value2-1-13 | threshold value2-2-13 | threshold value2-3-13 | threshold value2-4-13 | threshold value2-5-13 | threshold value2-6-13 | threshold value2-7-13 | threshold value2-8-13 | threshold value2-9-13 | threshold value2-10-13 | | | | |
| 700 | threshold value2-1-14 | threshold value2-2-14 | threshold value2-3-14 | threshold value2-4-14 | threshold value2-5-14 | threshold value2-6-14 | threshold value2-7-14 | threshold value2-8-14 | threshold value2-9-14 | threshold value2-10-14 | | | | |
| | gripping speed(mm/s) | | | | | | | | | | | | | |
| gripping force(N) | 55 | 60 | 65 | 70 | 75 | 80 | 85 | 90 | 95 | 100 | | | | |
| 50 | threshold value2-11-1 | threshold value2-12-1 | threshold value2-13-1 | threshold value2-14-1 | threshold value2-15-1 | threshold value2-16-1 | threshold value2-17-1 | threshold value2-18-1 | threshold value2-19-1 | threshold value2-20-1 | | | | |
| 100 | threshold value2-11-2 | threshold value2-12-2 | threshold value2-13-2 | threshold value2-14-2 | threshold value2-15-2 | threshold value2-16-2 | threshold value2-17-2 | threshold value2-18-2 | threshold value2-19-2 | threshold value2-20-2 | | | | |
| 150 | threshold value2-11-3 | threshold value2-12-3 | threshold value2-13-3 | threshold value2-14-3 | threshold value2-15-3 | threshold value2-16-3 | threshold value2-17-3 | threshold value2-18-3 | threshold value2-19-3 | threshold value2-20-3 | | | | |
| 200 | threshold value2-11-4 | threshold value2-12-4 | threshold value2-13-4 | threshold value2-14-4 | threshold value2-15-4 | threshold value2-16-4 | threshold value2-17-4 | threshold value2-18-4 | threshold value2-19-4 | threshold value2-20-4 | | | | |
| 250 | threshold value2-11-5 | threshold value2-12-5 | threshold value2-13-5 | threshold value2-14-5 | threshold value2-15-5 | threshold value2-16-5 | threshold value2-17-5 | threshold value2-18-5 | threshold value2-19-5 | threshold value2-20-5 | | | | |
| 300 | threshold value2-11-6 | threshold value2-12-6 | threshold value2-13-6 | threshold value2-14-6 | threshold value2-15-6 | threshold value2-16-6 | threshold value2-17-6 | threshold value2-18-6 | threshold value2-19-6 | threshold value2-20-6 | | | | |
| 350 | threshold value2-11-7 | threshold value2-12-7 | threshold value2-13-7 | threshold value2-14-7 | threshold value2-15-7 | threshold value2-16-7 | threshold value2-17-7 | threshold value2-18-7 | threshold value2-19-7 | threshold value2-20-7 | | | | |
| 400 | threshold value2-11-8 | threshold value2-12-8 | threshold value2-13-8 | threshold value2-14-8 | threshold value2-15-8 | threshold value2-16-8 | threshold value2-17-8 | threshold value2-18-8 | threshold value2-19-8 | threshold value2-20-8 | | | | |
| 450 | threshold value2-11-9 | threshold value2-12-9 | threshold value2-13-9 | threshold value2-14-9 | threshold value2-15-9 | threshold value2-16-9 | threshold value2-17-9 | threshold value2-18-9 | threshold value2-19-9 | threshold value2-20-9 | | | | |
| 500 | threshold value2-11-10 | threshold value2-12-10 | threshold value2-13-10 | threshold value2-14-10 | threshold value2-15-10 | threshold value2-16-10 | threshold value2-17-10 | threshold value2-18-10 | threshold value2-19-10 | threshold value2-20-10 | | | | |
| 550 | threshold value2-11-11 | threshold value2-12-11 | threshold value2-13-11 | threshold value2-14-11 | threshold value2-15-11 | threshold value2-16-11 | threshold value2-17-11 | threshold value2-18-11 | threshold value2-19-11 | threshold value2-20-11 | | | | |
| 600 | threshold value2-11-12 | threshold value2-12-12 | threshold value2-13-12 | threshold value2-14-12 | threshold value2-15-12 | threshold value2-16-12 | threshold value2-17-12 | threshold value2-18-12 | threshold value2-19-12 | threshold value2-20-12 | | | | |
| 650 | threshold value2-11-13 | threshold value2-12-13 | threshold value2-13-13 | threshold value2-14-13 | threshold value2-15-13 | threshold value2-16-13 | threshold value2-17-13 | threshold value2-18-13 | threshold value2-19-13 | threshold value2-20-13 | | | | |
| 700 | threshold value2-11-14 | threshold value2-12-14 | threshold value2-13-14 | threshold value2-14-14 | threshold value2-15-14 | threshold value2-16-14 | threshold value2-17-14 | threshold value2-18-14 | threshold value2-19-14 | threshold value2-20-14 | | | | |

FIG.4-2

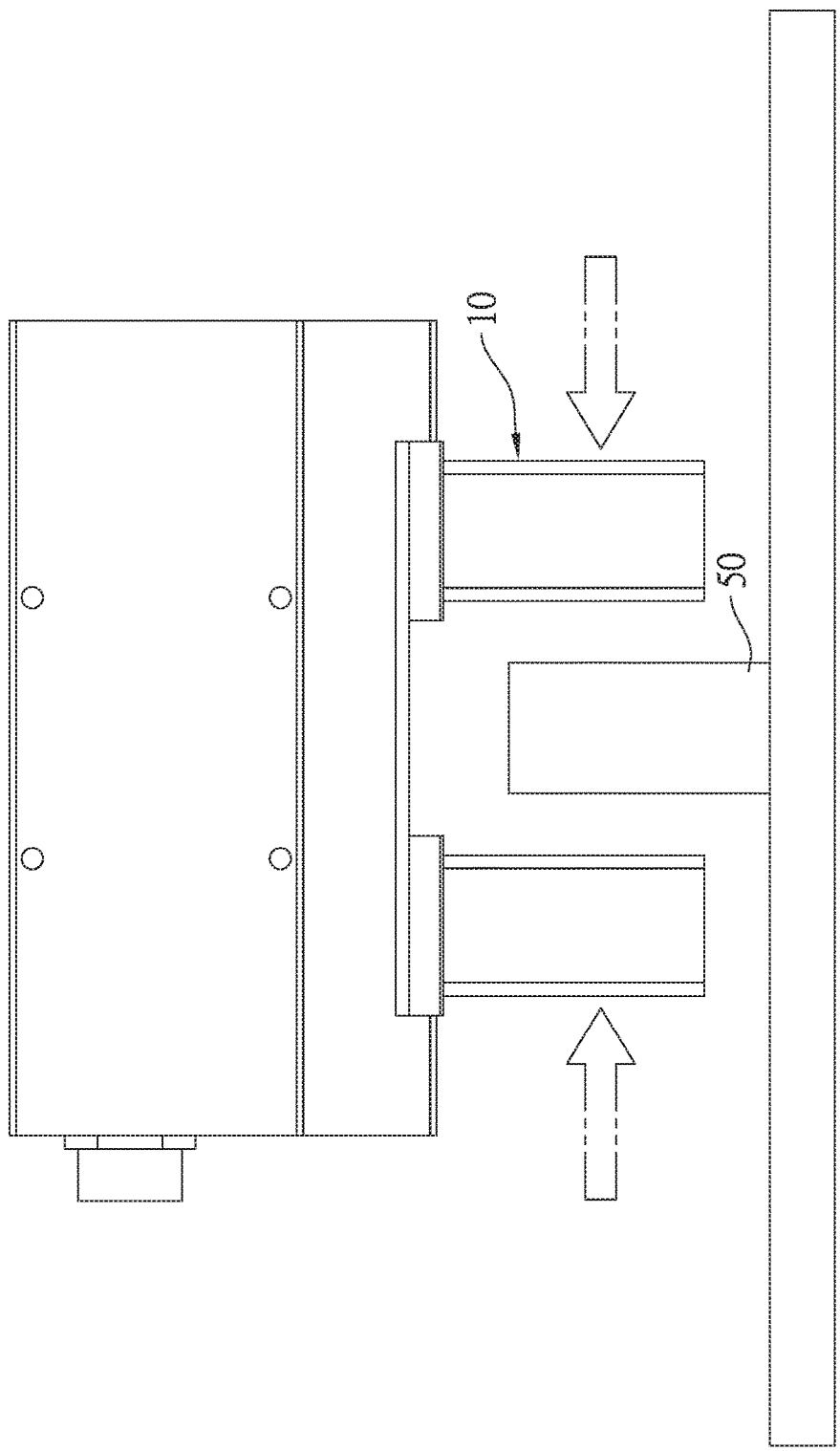

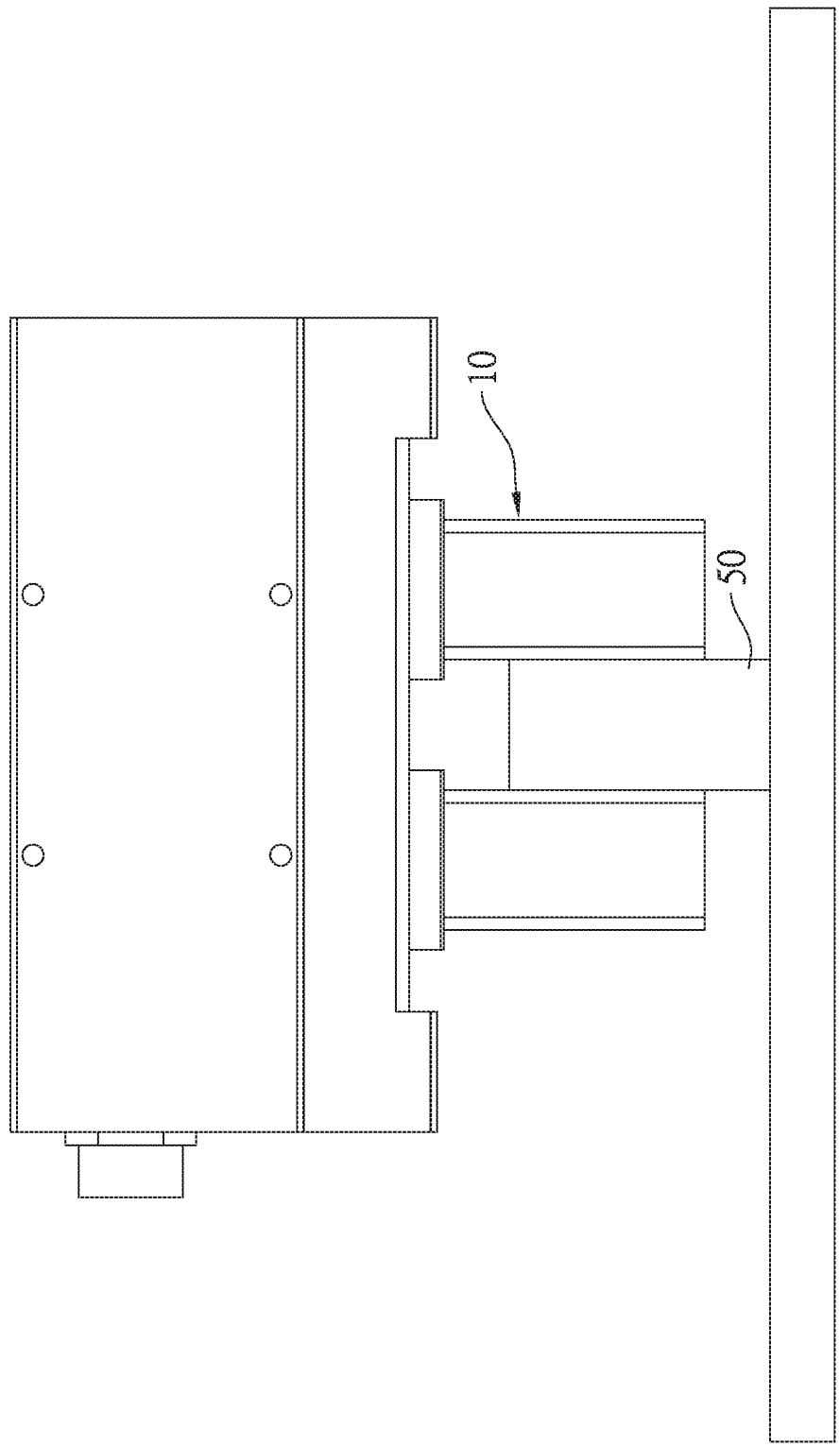

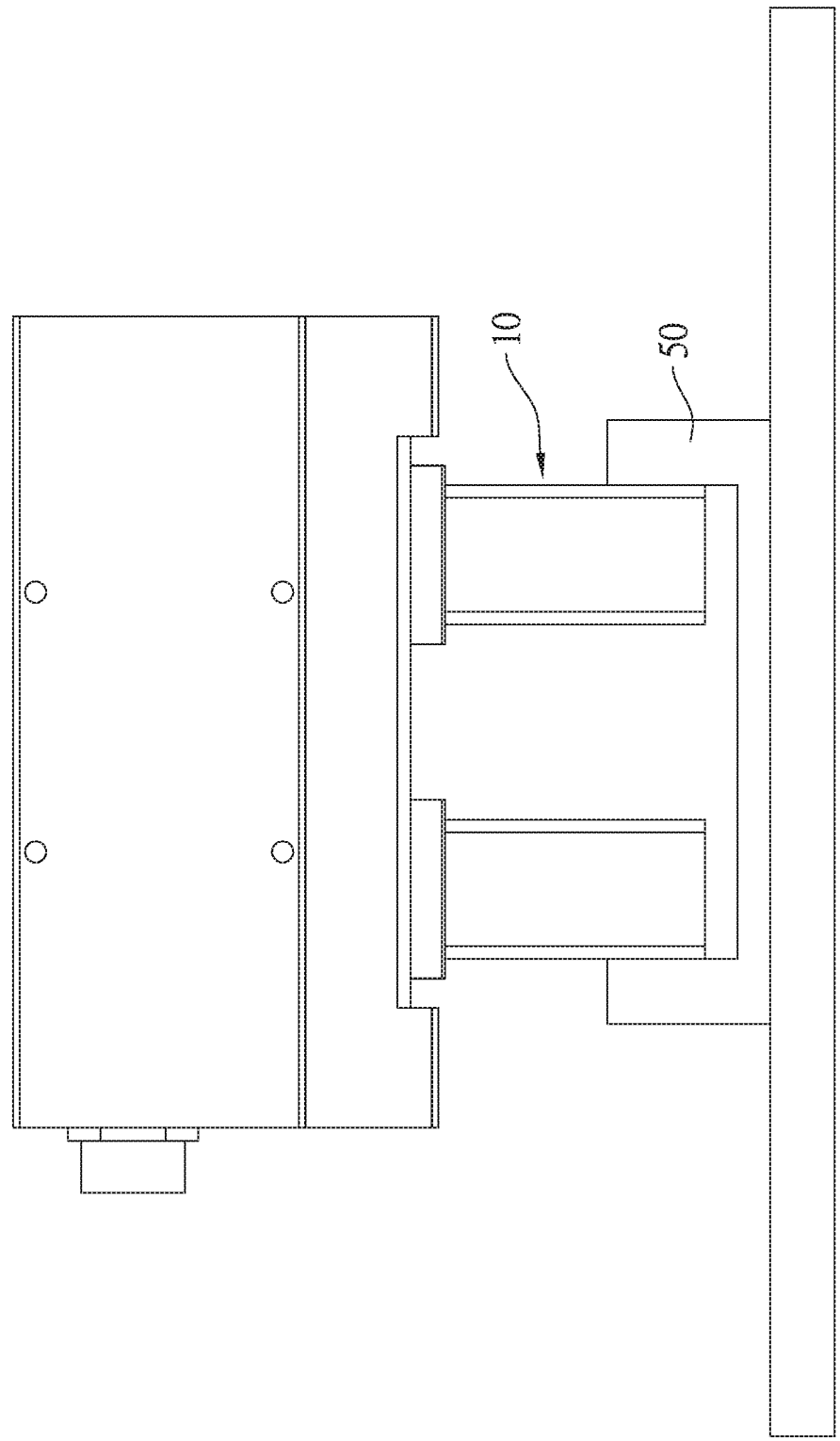

GRIPPING SYSTEM WHICH IS MONITORED BASED ON COUNTER ELECTROMOTIVE FORCE AND A METHOD FOR CONTROLLING THE GRIPPING SYSTEM

CROSS REFERENCE TO RELATED APPLICATION

This application is a continuation in part of U.S. patent application Ser. No. 15/789,256, filed on Oct. 20, 2017, which is a continuation-in-part of U.S. patent application Ser. No. 15/046,169, filed on Feb. 17, 2016, the entire specifications of which are incorporated herein by reference.

BACKGROUND

Field of the Invention

The present invention relates to a manipulator, and more particularly to a gripping system which is monitored based on counter electromotive force, and a method for controlling the gripping system.

Related Prior Art

With the wide application of automatic production in various fields, the electric grippers with a compact size, light weight and high flexibility are becoming more and more important. To ensure the stability of a gripping operation, the electric gripper must be controlled or monitored in real time.

There are many ways to control or monitor the electric gripper. One of them is based on the characteristic of a stepper motor, namely, the torque of a stepper motor is inversely proportional to the rotation speed, so that the gripping force of the gripper which is driven by the stepper motor can be controlled by controlling the rotation speed of the stepper motor. However, since the torque of a stepper motor is inversely proportional to the rotation speed, when the rotation speed changes rapidly, such as rapid acceleration, the torque will decrease and cause out of step, which consequently affects grip stability.

Another way of control is to arrange an additional sensor to detect the occurrence of out of step of the motor. The power of the motor will be cut off immediately when the motor falls out of step, and a retaining mechanism will be used to maintain the gripping force. The disadvantage of this way of control is that the maintaining of the gripping force only occurs when the motor falls out of step. Therefore, the occurrence of out of step is unavoidable, consequently, the griping force cannot be stably controlled. Besides, this way of control further requires the use of an independent retaining mechanism to maintain the gripping force, which complicates the structure while increasing the manufacturing cost.

The present invention has arisen to mitigate and/or obviate the afore-described disadvantages.

SUMMARY

The present invention is aimed at providing a gripping system which is monitored based on counter electromotive force (CEMF), and a method for controlling the gripping system, which are capable of solving the problem of the conventional gripper control method and device that the gripping force can be stably controlled, and the mechanical structure is complicated.

Therefore, a gripping system which is monitored based on counter electromotive force in accordance with the present invention comprises:

a gripper;

a stepper motor connected to the gripper and driving the gripper to perform gripping inward or gripping outward motions;

a controller electrically connected to the stepper motor, and including a drive unit, a control unit, an instruction receiving unit, and an access unit which are electrically connected to one another; wherein:

the drive unit is electrically connected to the stepper motor to rotate the stepper motor, and feedbacks an actual counter electromotive force of the stepper motor;

the control unit is electrically connected to the drive unit;

the instruction receiving unit is electrically connected to the control unit, and able to receive a control instruction for controlling gripping status, griping speed, and gripping force of the gripper; and the access unit is electrically connected to the control unit, a control parameter matrix is stored in the access unit, the control parameter matrix is a 3-D matrix defined by using the gripping status, the griping speed, and the gripping force as parameters, the gripping status includes gripping inward and gripping outward, each position in the matrix includes a corresponding counter electromotive force threshold, the control unit is capable of controlling operation of the stepper motor based on the control instruction from the instruction receiving unit, the control unit is further capable of obtaining the corresponding counter electromotive force threshold by comparing the control instruction with the control parameter matrix, and then the control unit compares the actual counter electromotive force, and controls the stepper motor according to comparison result.

A method for controlling a gripping system based on counter electromotive force in accordance with the present invention, comprises the following steps:

using a controller to instruct a drive unit, via a control instruction, to rotate a stepper motor until a gripper contacts an object to be gripped, so that a feedback actual counter electromotive force begins to drop;

using the controller to compare the control instruction with a control parameter matrix stored in an access unit, the control parameter matrix is a 3-D matrix defined by using the gripping status, the griping speed, and the gripping force as parameters, the gripping status includes gripping inward and gripping outward, each position in the matrix corresponds to a counter electromotive force threshold;

obtaining a corresponding counter electromotive force threshold by using the controller to check position of the parameters of the control instruction in the control parameter matrix;

using the controller to continuously monitor the actual counter electromotive force; and using the controller to compare the actual counter electromotive force with the obtained corresponding counter electromotive force threshold, stopping the stepper motor and letting the gripper maintain the gripping status when the actual counter electromotive force drops until it is equal to the counter electromotive force threshold, and maintaining driving of the stepper motor when the actual counter electromotive force is larger than the counter electromotive force threshold.

The present invention measures in advance the operation parameters when the stepper motor runs well without falling out of step, which ensures that the objected can be stably gripped before abnormality occurs, thus stabilizing the gripping motion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 4-1 is a reference table of the counter electromotive force threshold in correspondence to the control parameter matrix, when a gripper of the present invention performs gripping inward motions;

FIG. 4-2 is a reference table of the counter electromotive force threshold in correspondence to the control parameter matrix, when the gripper of the present invention performs gripping outward motions;

FIG. 5 is an illustrative view of the present invention showing that the gripper is in a status of closing (moving inward);

FIG. 6 is an illustrative view of the present invention showing that the gripper is in a status of gripping inward;

FIG. 8 is an illustrative view of the present invention showing that the gripper is in a status of gripping outward.

DETAILED DESCRIPTION

Figure 1:
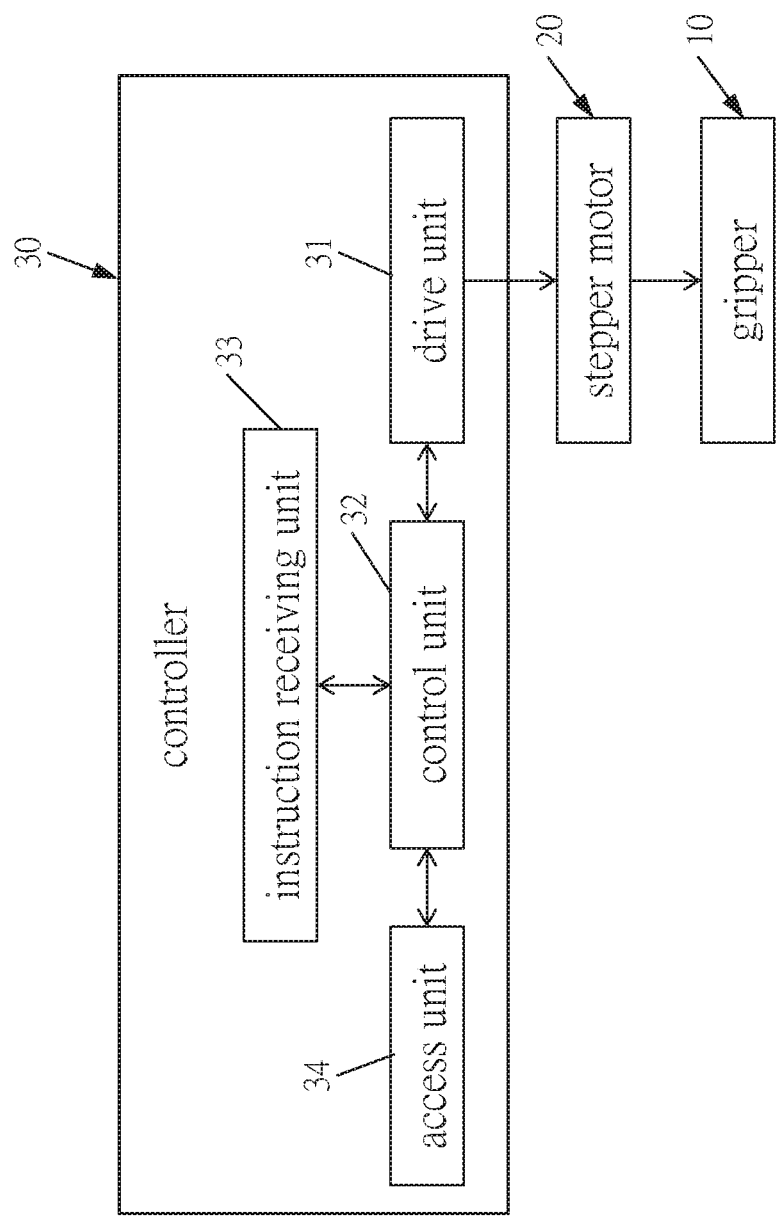
FIG. 1 is a block diagram of a gripping system which is monitored based on counter electromotive force in accordance with a preferred embodiment of the present invention.
Figure 2:
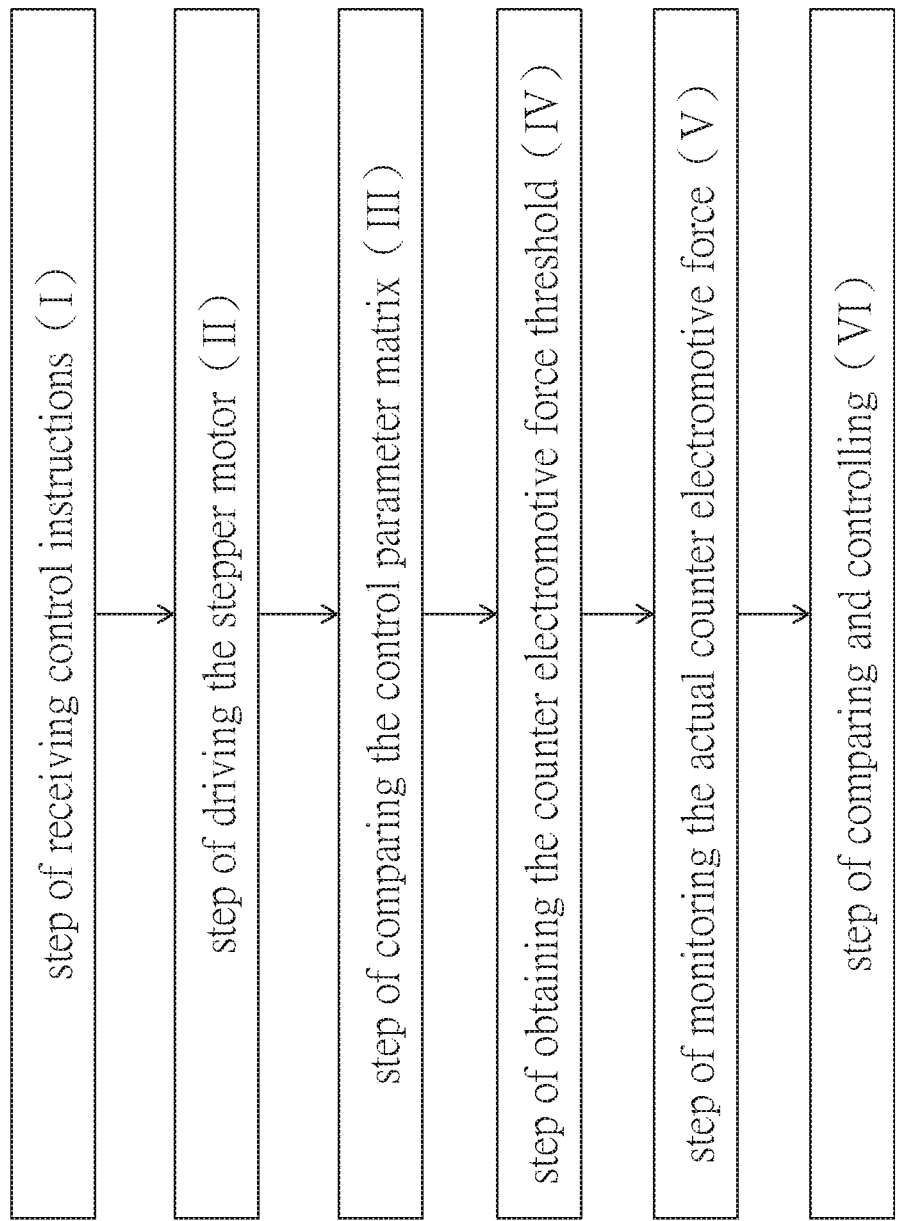
FIG. 2 is a flow chart of a method for controlling the gripping system which is monitored based on counter electromotive force in accordance with the preferred embodiment of the present invention.

The present invention will be clearer from the following description when viewed together with the accompanying drawings, which show, for purpose of illustrations only, the preferred embodiment in accordance with the present invention.

Referring to FIG. 1 to FIG. 4-2, a gripping system which is monitored based on counter electromotive force in accordance with the preferred embodiment of the present invention comprises: a gripper 10, a stepper motor 20, and a controller 30.

The stepper motor 20 is connected to the gripper 10 and can drive the gripper 10 to perform gripping inward or gripping outward motions.

The controller 30 is electrically connected to the stepper motor 20, and includes a drive unit 31, a control unit 32, an instruction receiving unit 33, and an access unit 34 which are electrically connected to one another.

The drive unit 31 is electrically connected to the stepper motor 20 to rotate the stepper motor 20, and feedbacks an actual counter electromotive force of the stepper motor 20.

The control unit 32 is electrically connected to the drive unit 31.

The instruction receiving unit 33 is electrically connected to the control unit 32, and able to receive control instructions for controlling the gripping status, the griping speed, and the gripping force of the gripper 10.

The access unit 34 is electrically connected to the control unit 32, and in the access unit 34 is stored a control parameter matrix which is a 3-D matrix defined by using the gripping status (gripping inward and gripping outward), the griping speed, and the gripping force as parameters. Each position in the matrix corresponds to a counter electromotive force threshold, and the above parameters are all measured when the stepper motor runs well without falling out of step. The control unit 32 is capable of controlling the operation of the stepper motor 20 based on the control instruction from the instruction receiving unit 33. The control unit 32 is further capable of obtaining corresponding counter electromotive force threshold by comparing the control instruction with the control parameter matrix, and then the control unit 32 compares the actual counter electromotive force, and controls the stepper motor 20 according to the comparison result.

The following is described in particular for the gripping statuses of the gripper 10, in this embodiment, the gripping state includes: gripper inward and gripping outward. To illustrate the difference between the gripping statuses, namely, the gripping inward, gripping outward, opening (moving outward) and closing (moving inward) of the gripper 10, please refer to FIGS. 5 to 8:

Referring first to FIG. 5, which shows the status of closing (moving inward) of the gripper 10, the gripper 10 is moving when in a gripping status, at this moment, the gripper 10 has not gripped the object 50 yet, so the counter electromotive force value is constant. In contrast, the status of gripping inward of the present invention is as shown in FIG. 6, the status of gripping inward means that the gripper 10 has gripped the object 50, thereby dropping the counter electromotive force value.

Figure 7:
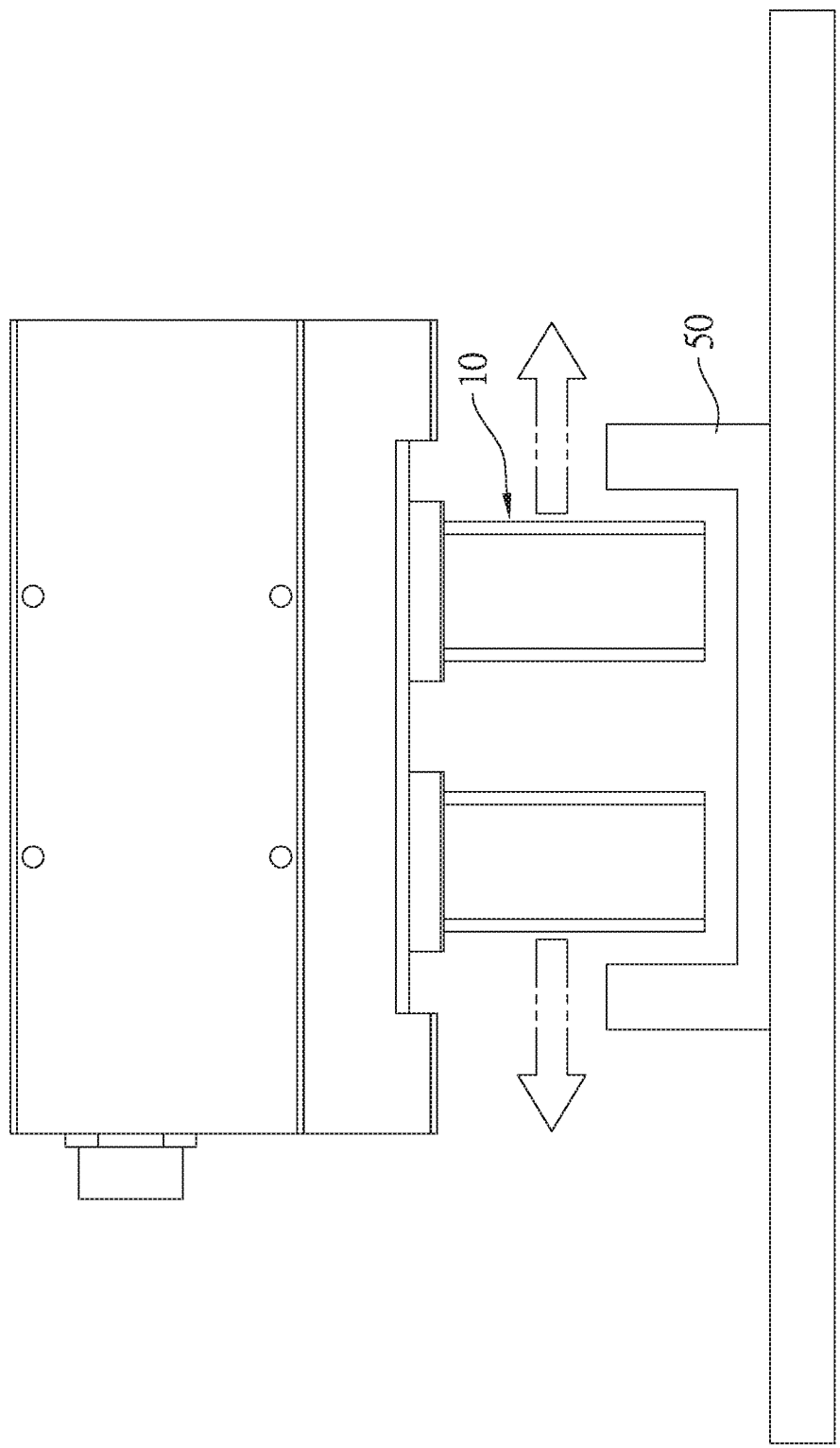
FIG. 7 is an illustrative view of the present invention showing that the gripper is in a status of opening (moving outward)

Referring to FIG. 7, which shows the status of opening (moving outward) of the gripper 10, the gripper 10 is moving when in a gripping status, at this moment, the gripper 10 has not gripped the object 50 yet, so the counter electromotive force value is constant. In contrast, the status of gripping outward of the present invention is as shown in FIG. 8, the gripping outward means that the gripper inserts into the groove or hole of the object 50 to be gripped, and the gripper 10 opens until it pushes against the inner surface of the groove or hole of the object 50, at this moment, since the gripper 10 has gripped the object 50, the counter electromotive force value will be dropped.

In addition, it is worth mentioning that the gripper 10 has different counter electromotive force values in the two statuses of the gripping inward and outward. Therefore, the clamping device 10 also has two different counter electromotive force thresholds when in the two statuses of the gripping inward and outward. For example, in the case where the preset gripping speeds and the gripping forces are the same, and only the gripping statuses are different, the corresponding counter electromotive force thresholds in the control parameter matrix will be different.

Figure 3:
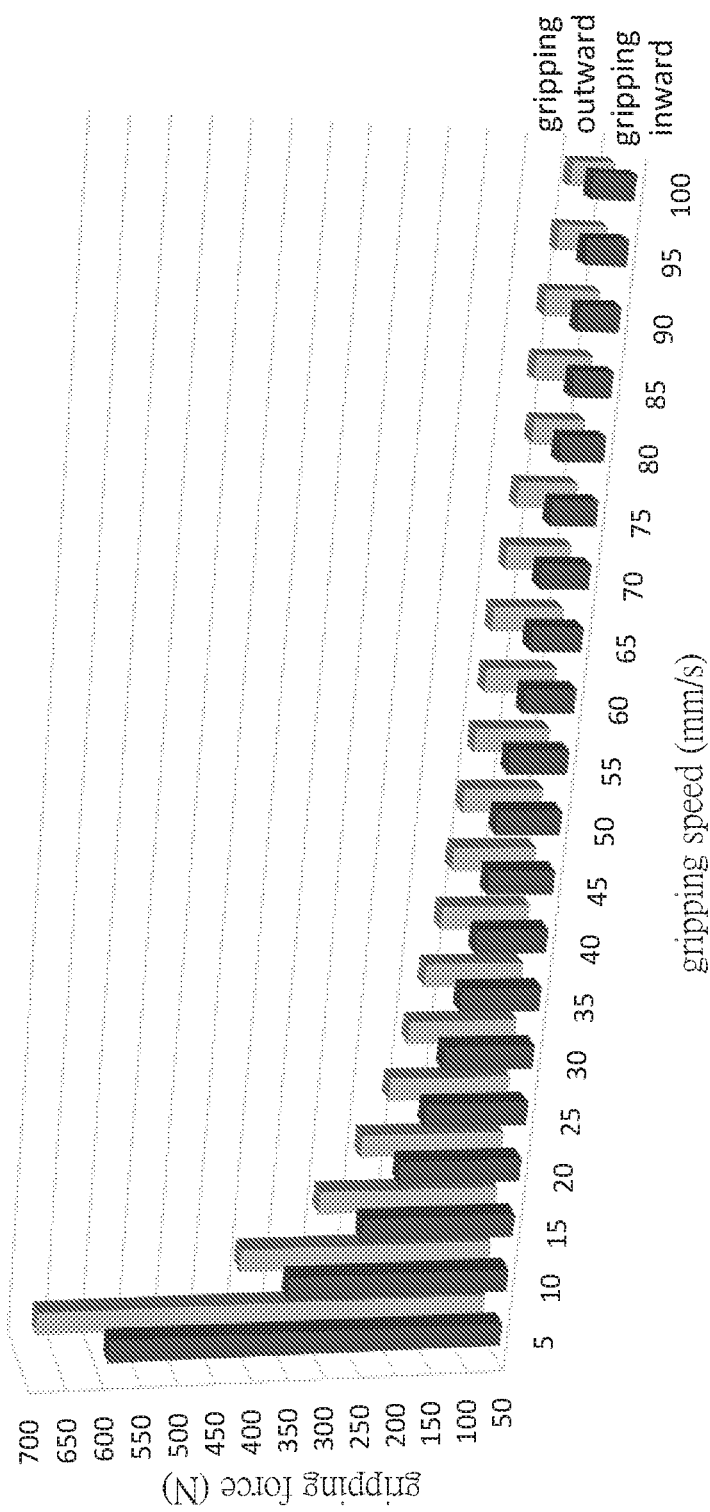
FIG. 3 is an illustrative view of a control parameter matrix of the present invention.

What mentioned above are the structure relations of the components of the gripping system which is monitored based on counter electromotive force, and the method for controlling the gripping system in accordance with the present invention comprises the following steps:

Step I of receiving control instructions: using the instruction receiving unit 33 to receive control instructions for controlling the gripping status (gripping inward and outward), the griping speed (speed of gripping motion), and the gripping force;

Step II of driving the stepper motor: accessing, by the control unit 32, the received control instructions, driving the stepper motor 20 to rotate in accordance with the gripping speed and the value of the gripping force set by the control instructions until the gripper 10 contacts the object 50 to be gripped, so that the actual feedback counter electromotive force value begins to drop;

Step III of comparing the control parameter matrix: using the control unit 32 of the controller 30 to compare the parameters of the received control instructions with the control parameter matrix stored in the access unit 34, each position in the matrix corresponds to a counter electromotive force threshold;

Step IV of obtaining the counter electromotive force threshold: obtaining a corresponding counter electromotive force threshold by using the controller 30 to check the position of the parameters of the received control instructions in the control parameter matrix. More specifically, as shown in FIG. 3, the control parameter matrix is a 3-D matrix defined by using the gripping status, the griping speed, and the gripping force as parameters. Of course, the elements in the respective dimensions of the control parameter matrix can be changed as desired. For example, the first dimension represents the gripping status, and the gripping status includes 2 elements which represent gripping inward (0) and gripping outward (1), respectively. The second dimension represents gripping speed, and includes 20 elements which each represent from 5 mm/s to 100 mm/s. The third dimension represents the gripping force and includes 14 elements which each represent the gripping force from 50N to 700N. When the instruction receiving unit 33 receives control instructions, the control unit 32 will access the control parameter matrix stored in the access unit 34 to obtain the corresponding counter electromotive force threshold. For example, when the instruction is "gripping outward, 20 mm/s, 300N", the control unit 32 will check the corresponding parameters to find out the position [2][4][6] in the control parameter matrix, and read the counter electromotive force in that position of [2][4][6].

Step V of monitoring the actual counter electromotive force: using the control unit 32 of the controller 30 to continuously monitor the actual counter electromotive force fed back from the drive unit 31;

Step VI of comparing and controlling: using the control unit 32 to compare the actual counter electromotive force with the obtained counter electromotive force threshold, stopping the stepper motor 20 and letting the gripper 10 maintain the gripping status (at this time, the actual gripping force of the gripper 10 is the same as the corresponding gripping force in the control parameter matrix) when the actual counter electromotive force drops until it is equal to the counter electromotive force threshold, and maintaining driving of the stepper motor 20 when the actual counter electromotive force is larger than the counter electromotive force threshold.

In summary, the present invention measures in advance the operation parameters when the stepper motor runs well without falling out of step, and creates the control parameter matrix by using the operation parameters. The present invention further feeds back the actual counter electromotive force in real time, and compares the control parameter matrix when the gripper 10 grips the object, so that monitoring can be performed in real time based on the comparison results, so as to achieve the purpose of monitoring in real time, and stabilizing the gripping parameters.

Since the counter electromotive force is used as a base for real time monitoring, and the control parameter matrix is used as a reference, the present invention can truly prevent the occurrence of out of step, ensure that every gripping motion is maintained in the best condition, and prevent loosening of workpieces, which consequently improves the yield rate.

Besides, with the counter electromotive force generated by the stepper motor 20, the present invention requires the use of an independent torque sensor during the whole monitoring process. Therefore, the present invention has the advantages of simple structure and high assembly flexibility, which consequently adds value to the products.

Furthermore, the control parameter matrix of the present invention is a 3-D matrix defined by using the gripping status, the griping speed, and the gripping force as parameters, which means that the present invention is always capable of obtaining a corresponding counter electromotive force threshold no matter how the gripping status, the griping speed, and the gripping force change. Therefore, the present invention is very dynamic, and has high application availability. Base on this, it can further be inferred that, when the control parameter of the gripping system changes, the parameter value of the control parameter matrix also changes. The control parameter matrix is not limited to the embodiment shown in FIG. 3.

While we have shown and described various embodiments in accordance with the present invention, it is clear to those skilled in the art that further embodiments may be made without departing from the scope of the present invention.

What is claimed is:

1. A gripping system which is monitored based on counter electromotive force, comprising: a gripper;
   a stepper motor connected to the gripper and driving the gripper to perform gripping inward or gripping outward motions for gripping an object;
   a controller electrically connected to the stepper motor, and including a drive unit, a control unit, an instruction receiving unit, and an access unit which are electrically connected to one another; wherein:
   the drive unit is electrically connected to the stepper motor to rotate the stepper motor, and feedbacks an actual counter electromotive force of the stepper motor;
   the control unit is electrically connected to the drive unit;
   the instruction receiving unit is electrically connected to the control unit, and able to receive a control instruction for controlling gripping status, griping speed, and gripping force of the gripper; and
   the access unit is electrically connected to the control unit, a control parameter matrix is stored in the access unit, the control parameter matrix is a 3-D matrix defined by using the gripping status, the griping speed, and the gripping force as parameters, the gripping status includes gripping inward and gripping outward, each position in the matrix includes a corresponding counter electromotive force threshold, the control unit is capable of controlling operation of the stepper motor based on the control instruction from the instruction receiving unit, the control unit is further capable of obtaining the corresponding counter electromotive force threshold by comparing the control instruction with the control parameter matrix, and then the control unit compares the actual counter electromotive force, and controls the stepper motor according to comparison result.

2. A method for controlling a gripping system based on counter electromotive force, comprising the following steps:

using a controller to instruct a drive unit, via a control instruction, to rotate a stepper motor until a gripper contacts an object to be gripped, so that a feedback actual counter electromotive force begins to drop;

using the controller to compare the control instruction with a control parameter matrix stored in an access unit, the control parameter matrix is a 3-D matrix defined by using the gripping status, the griping speed, and the gripping force as parameters, the gripping status includes gripping inward and gripping outward, each position in the matrix corresponds to a counter electromotive force threshold;

obtaining a corresponding counter electromotive force threshold by using the controller to check position of the parameters of the control instruction in the control parameter matrix;

using the controller to continuously monitor the actual counter electromotive force; and using the controller to compare the actual counter electromotive force with the obtained corresponding counter electromotive force threshold, stopping the stepper motor and letting the gripper maintain the gripping status when the actual counter electromotive force drops until it is equal to the counter electromotive force threshold, and maintaining driving of the stepper motor when the actual counter electromotive force is larger than the counter electromotive force threshold.

* * * * *